United States Patent [19]

Hayashi

[11] Patent Number: 4,507,637

[45] Date of Patent: Mar. 26, 1985

[54] COIL FOR ELECTRIC MOTOR

[75] Inventor: Tsuneyuki Hayashi, Chigasaki, Japan

[73] Assignee: Sony Corporation, Tokyo, Japan

[21] Appl. No.: 634,178

[22] Filed: Jul. 25, 1984

Related U.S. Application Data

[63] Continuation of Ser. No. 356,164, Mar. 8, 1982, abandoned, which is a continuation of Ser. No. 188,520, Sep. 18, 1980, abandoned.

[30] Foreign Application Priority Data

Sep. 27, 1979 [JP] Japan ................... 54-124370

[51] Int. Cl.³ ..................... H01F 15/02; H01F 15/10
[52] U.S. Cl. ..................... 336/65; 310/208; 310/DIG. 6; 336/192; 336/205
[58] Field of Search ........... 29/605, 598; 310/40 MM, 310/43, 71, 268, 208, DIG. 6; 336/192, 205, 96, 65, 200, 225, 227, 228

[56] References Cited

U.S. PATENT DOCUMENTS

| | | | |
|---|---|---|---|
| 1,906,812 | 5/1933 | Rowell | 336/225 X |
| 3,060,337 | 10/1962 | Baudot | 310/268 |
| 3,097,319 | 7/1963 | Baudot | 310/268 X |
| 3,280,353 | 10/1966 | Haydon et al. | 310/268 X |
| 3,412,354 | 11/1968 | Sattler | 336/205 |
| 3,430,174 | 2/1969 | Kogo et al. | 336/205 |
| 3,824,518 | 7/1974 | Slenker | 336/192 X |
| 3,867,656 | 2/1975 | Mitsui et al. | 310/268 X |
| 3,988,024 | 10/1976 | Watanabe et al. | 310/268 X |
| 4,093,897 | 6/1978 | Fujita et al. | 310/268 X |
| 4,109,170 | 8/1978 | Fujita et al. | 310/268 X |
| 4,110,901 | 9/1978 | Nakamura et al. | 29/598 |
| 4,220,879 | 9/1980 | Hoshimi et al. | 310/268 |
| 4,236,295 | 12/1980 | Nakamura | 29/598 |

FOREIGN PATENT DOCUMENTS 2424290 11/1975 Fed. Rep. of Germany .

Primary Examiner—Thomas J. Kozma
Attorney, Agent, or Firm—Hill, Van Santen, Steadman & Simpson

[57] ABSTRACT

A wire having conductor core, insulating film formed on the conductor core and adhesive film formed on the insulating film is closely and fixedly wound by a predetermined number of turns. Thus, a coil for an electric motor is obtained. A pair of electrodes are formed by stripping portions of the insulating film and portions of the adhesive film formed on the insulating film.

4 Claims, 7 Drawing Figures

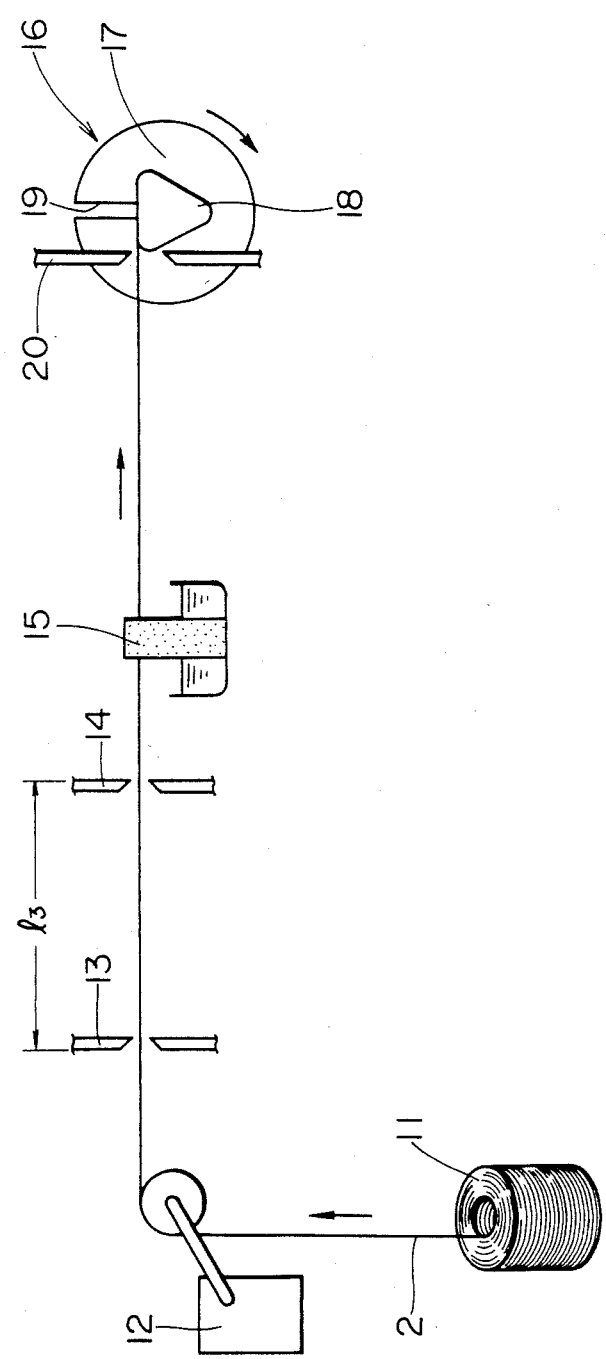

COIL FOR ELECTRIC MOTOR

This is a continuation of application Ser. No. 356,164, now abandoned, filed Mar. 8, 1982 which was a continuation of Ser. No. 188,520, now abandoned, filed Sept. 18, 1980.

BACKGROUND OF THE INVENTION

1. Field of the Invention:

This invention relates to a coil for an electric motor which is attached to a printed circuit board, and more particularly to a coil most suitable for a flat brushless DC motor.

2. Description of the Prior Art:

For example, a coil 1 shown in FIG. 1 is used for a prior flat brushless DC motor. The coil 1 is formed substantially in the shape of a triangle, and it has a substantially triangular opening 1a. Terminal portions 1b and 1c are led out as lead wires. A conductor wire 2 shown in FIG. 2 is used for forming the coil 1. In the conductor wire 2, an insulating film 4, for example, of enamel is formed on a core wire 3 of copper, and an adhesive film 5 is formed on the insulating film 4. This conductor wire 2 is so called "self-bonding wire".

In a flat brushless DC motor, a plurality of the coils 1 are mounted on predetermined positions of a printed circuit board. The lead wires 1b and 1c are soldered to predetermined circuit patterns, or to predetermined terminal pins fixed on the printed circuit board. In the soldering operation, the lead wires 1b and 1c are manually positioned on the predetermined circuit patterns or to the predetermined terminal pins. The soldering operation is very inefficient. When the lead wires 1b and 1c are soldered to the predetermined terminal pins, a special device is required for engaging the lead wires 1b and 1c with the terminal pins. A considerable space is required for introducing the lead wires 1b and 1c from the coil 1, resulting in the electric motors being large. The lead wires 1b and 1c will easily disconnect from the electrical circuit causing open circuits and faults and reducing reliability.

The coil 1 is formed by an automatic winding machine. In the winding operation, the lead wire 1b which is the initial end of the coil 1 contacts with a side surface 1d of the coil 1. The contacting portion is often disorderly wound. It is difficult to orderly wind the coil 1 at high density.

SUMMARY OF THE INVENTION

An object of this invention is to provide a coil for an electric motor in which the mounting process for a printed circuit board can be facilitated.

Another object of this invention is to provide a coil for an electric motor which has improved reliability.

A further object of this invention is to provide a coil for an electric motor in which the electric motor can be small.

A still further object of this invention is to provide a method for manufacturing the above described coil.

In accordance with an aspect of this invention, a coil for an electric motor comprises (A) a wire having a conductor core and an insulating film formed on the conductor core with the wire being fixed to the core and closely wound thereon and (B) including a pair of electrodes formed by stripping portions of the insulating film from the wire.

Various other objects, advantages and features of the present invention will become readily apparent from the ensuing detailed description, and the novel features will be particularly pointed out in the appended claims.

BRIEF DESCRIPTION OF THE DRAWINGS

FIG. 7 is a schematic side view of one example of a manufacturing apparatus for the coil of this invention.

DETAILED DESCRIPTION OF THE PREFERRED EMBODIMENTS

Next, embodiments of this invention will be described with reference to FIG. 3 to FIG. 6.

Figure 3:
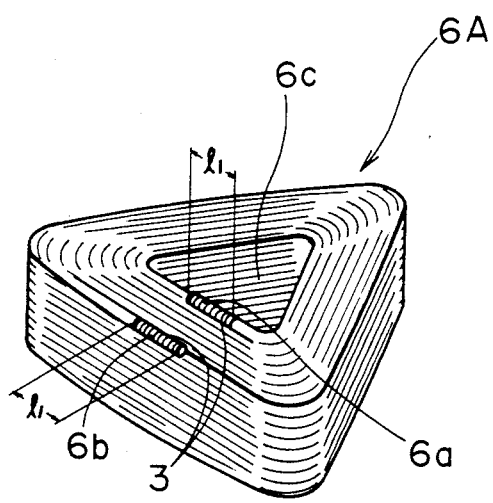
FIG. 3 is a perspective view of a coil according to a first embodiment of this invention.

FIG. 3 is a perspective view of a coil 6A according to a first embodiment of this invention. In the coil 6A, there are no conventional lead wires. The insulating film 4 and adhesive film 5 are stripped for a suitable length $l_1$ from the terminal portions of the coil 6A. The corresponding core wire portions 3 are exposed, and are used as electrodes 6a and 6b in the coil 6. This coil 6A has substantially the same shape as the conventional coil 1 shown in FIG. 1, and it has a substantially triangular inner opening 6c.

Figure 1:
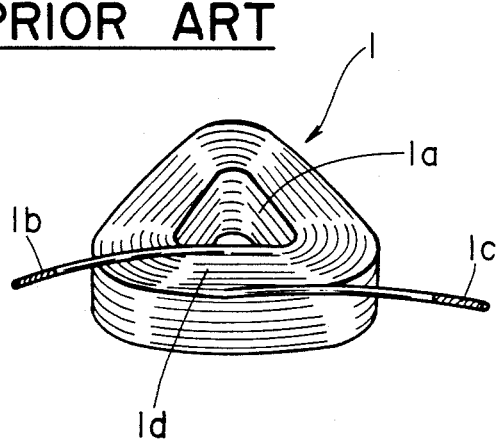
FIG. 1 is a perspective view of a prior art coil for an electric motor.
Figure 2:
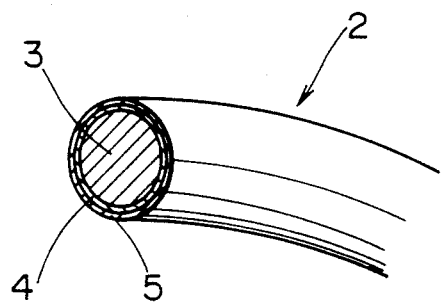
FIG. 2 is an enlarged perspective view of a portion of a wire usable for the prior art coil and a coil according to this invention.

The coil 6A can be formed by the same automatic winding machine as the coil 1 of FIG. 1. After the winding operation of the coil 6A has been completed the insulating film 4 and adhesive film 5 of the winding end portions are stripped for a length of about $2l_1$, and the corresponding core portions of about $2l_1$ are exposed. The exposed core portions are cut at the center. One of the cut end portions is the electrode 6b. The other of the cut end portions is the electrode 6a for the next coil. During the winding operation, solvent such as alcohol is sprayed on the self-bonding wire 2 to dissolve the adhesive film 5 and the adjacent portions of the self-bonding wire 2 are bonded to each other. The triangular shape shown in FIG. 3 is held due to the bonding. Although wire having round cross section is used for the coil 6, a wire having rectangular cross section may be used for the coil 6A.

Figure 4:
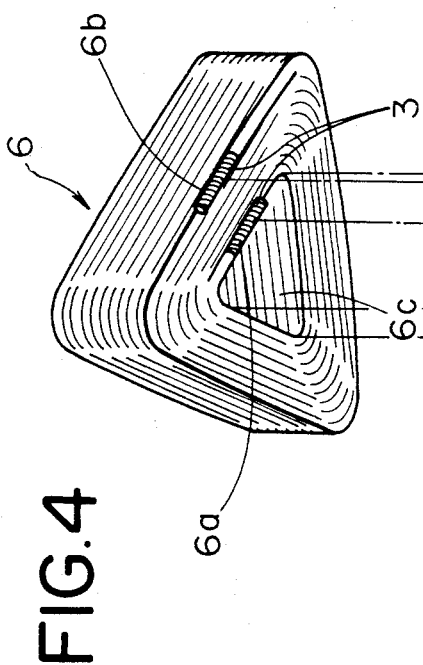
FIG. 4 is a perspective view of the coil of FIG. 3 and a printed circuit board onto which the coil of FIG. 3 is mounted.

The coil 6A can be mounted on a printed circuit board 7 in the manner shown in FIG. 4. The electrodes 6a and 6b of the coil 6A are placed on electrode portions of circuit patterns 8 and 9 of the printed circuit board 7 and they are soldered together. Thus, the coil 6A is mechanically and electrically connected to the patterns 8 and 9. When the mechanical connection is weak, adhesive or screws may be used to connect the coil 6A and the printed circuit board 7. Further, a triangular projection having a similar cross-section to the inside opening 6c of the coil 6 may be formed on the printed circuit board and the coil 6A can be fitted to the triangular projection. A projection 25 is formed on the printed circuit board 7 so that the opening 6c in the coil 6 will fit around it so that the projection 25 will hold the coil in a predetermined fixed relationship to the board.

Figure 5:
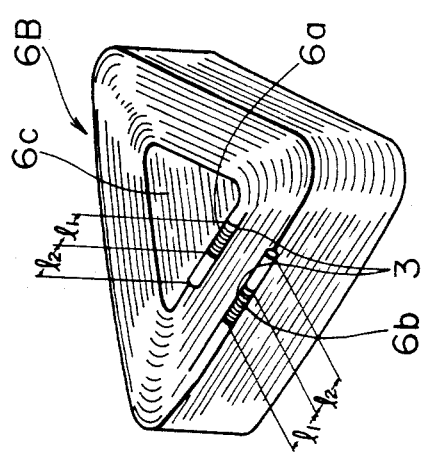
FIG. 5 is a perspective view of a coil according to a second embodiment of this invention.

FIG. 5 shows a coil 6B according to a second embodiment of this invention. Parts in FIG. 5 which correspond to those in FIG. 3, are denoted by the same reference numerals. In this embodiment, the electrodes 6a and 6b are formed at positions displaced by length $l_2$ from the ends of the coil 6B. The corresponding portions of the insulating film 4 and adhesive film 5 are stripped from the wire 2. It is possible that in the first embodiment of FIG. 3 that the electrodes 6a and 6b will be peeled from the surface of the coil 6B, and will be bent. However, in the embodiment of FIG. 5, the end portions of the length $l_2$ are bonded to the surface of the coil 6B. Accordingly, the electrodes 6a and 6b are prevented from peeling.

Figure 6:
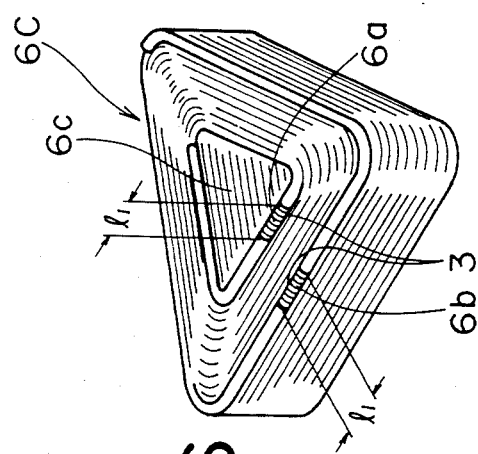
FIG. 6 is a perspective view of a coil according to a third embodiment of this invention.

FIG. 6 shows a coil 6C according to a third embodiment of this invention. Parts in FIG. 6 which correspond to those in the first embodiment of FIG. 3, are denoted by the same reference numerals. In this embodiment, the electrodes 6a and 6b are formed at positions which are a greater distant from the ends of the coil 6C than those of the coil 6B of FIG. 5. The length from the ends of the coil 6C to the electrodes 6a and 6b is greater than one side of the triangle. Accordingly, the electrodes 6a and 6b are less likely to peel than those of the coil 6b of FIG. 5.

Next, there will be described a method for manufacturing the above-described coil 6A, 6B or 6C with reference to FIG. 7.

FIG. 7 shows one example of the manufacturing apparatus for the coil.

The wire 2 is led out from a spool 11. The tension of the wire 2 is adjusted by a tension regulator 12. And the wire 2 passes over a roller and between cutters 13 and 14 which are spaced from each other by length $l_3$. The wire 2 passes through a felt member 15 impregnated with solvent such as alcohol so that the adhesive film 5 will be dissolved. Then, the wire 2 reaches a winding machine 16 which consists of a disc-like flange 17 fixed to a top end of a rotary shaft, and a bobbin 18 fixed onto the surface of the flange 17. The bobbin 18 has a substantially triangular cross-section which corresponds to the inside opening 6c of the coil 6A, 6B or 6C. One end of the wire 2 is introduced through a slit 19 formed in the flange 17, to the back surface of the flange 17, and it is clamped by a clamper arranged on the back surface of the flange 17. A cutter 20 is arranged near the bobbin 18.

In the manufacture of the coil 6A, 6B or 6C, the flange 17 and the bobbin 18 are rotated in the direction shown by the arrow, by the rotary shaft so that the wire 2 is wound on the bobbin 18. The cutters 13 and 14 are operated at the time when the wire 2 has been wound for a predetermined number of turns. The insulating film 4 and the adhesive film 5 of the length $l_1$ are stripped at two positions from the wire 2 by partially closing the cutters 13 and 14. They are stripped over the whole circumferential surface for a length $l_1$. Again, the wire 2 is taken up by the winding machine 16. After the portion stripped by the cutter 14 is taken up and additional wire 2 of about $l_3/2$ is taken up, the cutter 20 is operated to cut the wire 2 and the winding operation ends. The obtained coil 6A, 6B or 6C is removed from the bobbin 18 and the winding machine 16 is operated to form the next coil.

First, the cut end portion having length of about $l_3/2$ is taken up by the bobbin 18. Then, the portion stripped by the cutter 13 is taken up by the bobbin 18. When the wire 2 has been wound for the predetermined number of turns, the cutters 13 and 14 are operated to strip the insulating film 4 and the adhesive film 5 for a length of $l_1$. Next, the wire 2 is cut at the position midway between the stripped portions by the cutter 20.

The above described operation is repeated to form coils. Although not shown, a heater is arranged near the winding machine 16 so as to dry the adhesive film 4 which was dissolved by a solvent (alcohol) and to fix the coil.

The wire portion having a length of $l_1$ stripped by the cutter 14 corresponds to the electrode 6b of the coil 6A, 6B or 6C shown in FIG. 3, FIG. 5 and FIG. 6. The wire portion having a length of about $l_3/2$ succeeding to the wire portion of the length of $l_1$ stripped by the cutter 14 corresponds to the wire portion of the length of $l_2$ contiguous to the electrode 6b shown in FIG. 5. For the coil 6A of FIG. 3, the length $l_3$ is equal to zero. For the coil 6C of FIG. 6, the wire portion of the length of about $l_3/2$ corresponds to the length from the coil terminal end to the electrode 6b. The wire portion of the length of $l_1$ stripped by the cutter 13 corresponds to the electrode 6a of the coil 6A, 6B or 6C shown in FIG. 3, FIG. 5 and FIG. 6, and it corresponds to the wire portion having a length of about $l_3/2$. The latter corresponds to the wire portion of the length of $l_2$ contiguous to the electrode 6a shown in FIG. 5. For the coil 6C of FIG. 6, it corresponds to the length from the initial end of the coil end to the electrode 6a.

According to this invention, as above described, the coil does not have a lead wire which freely extends. A terminal pin is not required for the coil of this invention. The working efficiency can be improved because space for introducing lead wire is not required for the coil. The electric motor can be small. The reliability is improved. The coil can be orderly wound at higher densities. When an automatic mounting machine is used for mounting leadless circuit parts on a printed circuit board, the coil of this invention can be handled in the same manner as the other leadless circuit parts.

While this invention is illustrated with specific embodiments, it will be recognized by those skilled in the art that modifications may be made therein without departing from the true scope of the invention as defined by the following claims.

I claim as my invention:

1. A wound coil mounted on a plane painted circuit board for an electric motor comprising, wire with a conductive core and insulating film formed on the conductive core, said coil formed of wire which is wound substantially in the shape of a triangle, and said coil having a substantially triangular opening and said coil having at least one end plane surface in which the beginning and ending ends of said wire lie, and a pair of electrodes on or near the beginning and ending ends of said wire and formed by removing insulating film from said wire to bare said wire and said electrodes substantially located within the confines of said coil in said one end plane surface, wherein said wire has an adhesive film formed over said insulating film which binds said coil together, and wherein a first one of said pair of electrodes is located adjacent said triangular opening and a second one of said pair of electrodes is located at the outer surface of said coil remote from said triangular opening, wherein said first and second ones of said pair of electrodes are parallel to adjacent wire windings, and in which said electrodes are soldered to circuit patterns of said printed circuit board.

2. The combination according to claim 1, in which a triangular projection formed on said printed circuit board is fitted into said triangular opening of the coil.

3. The combination according to claim 1 wherein said first and second ones of said pair of electrodes are parallel to each other.

4. The combination according to claim 1 wherein said pair of electrodes are formed at positions from said beginning and ending ends of said wire such that the length of the insulated wire between said electrodes and their respective ends is the length of about one half turn of said coil.

* * * * *